United States Patent
Iwamoto et al.

(10) Patent No.: US 6,830,808 B2
(45) Date of Patent: Dec. 14, 2004

(54) PERFLUOROELASTOMER ARTICLES HAVING IMPROVED SURFACE PROPERTIES

(75) Inventors: Kaori Iwamoto, Tochigi (JP); Bunichi Rai, Tokyo (JP); Shinichi Sogo, Kanagawa (JP)

(73) Assignee: Dupont Dow Elastomers, LLC, Wilmington, DE (US)

( * ) Notice: Subject to any disclaimer, the term of this patent is extended or adjusted under 35 U.S.C. 154(b) by 0 days.

(21) Appl. No.: 10/612,494

(22) Filed: Jul. 2, 2003

(65) Prior Publication Data

US 2004/0071975 A1 Apr. 15, 2004

Related U.S. Application Data

(60) Provisional application No. 60/414,230, filed on Sep. 27, 2002.

(51) Int. Cl.[7] .......................... B32B 25/04; B32B 25/20; B32B 27/40
(52) U.S. Cl. .................... 428/336; 428/422; 428/423.1; 428/447
(58) Field of Search ................................ 428/336, 422, 428/423.1, 447

(56) References Cited

U.S. PATENT DOCUMENTS

| | | | |
|---|---|---|---|
| 5,441,771 A | | 8/1995 | Seltmann et al. |
| 5,674,567 A | | 10/1997 | Kausch et al. |
| 5,763,068 A | | 6/1998 | Kishino et al. |
| 5,844,051 A | | 12/1998 | Onzuka et al. |
| 6,682,779 B1 | * | 1/2004 | Wefringhaus et al. ...... 427/314 |
| 6,730,385 B1 | * | 5/2004 | Tanaka et al. ............. 428/66.4 |

FOREIGN PATENT DOCUMENTS

| | | | |
|---|---|---|---|
| WO | WO9906487 | | 2/1999 |
| WO | WO 99/21710 A1 | * | 5/1999 |
| WO | WO 01/23482 A1 | * | 4/2001 |
| WO | WO0220650 | | 3/2002 |

* cited by examiner

*Primary Examiner*—Ramsey Zacharia

(57) ABSTRACT

Cured perfluoroelastomer articles are disclosed which have improved surface characteristics. The articles are coated with a thin durable film comprising a polysiloxane and urethane oligomer which reduces surface stickiness, while maintaining the sealing properties of the article.

4 Claims, No Drawings

PERFLUOROELASTOMER ARTICLES HAVING IMPROVED SURFACE PROPERTIES

CROSS-REFERENCE TO RELATED APPLICATIONS

This application claims the benefit of U.S. Provisional Application No. 60/414,230 filed Sep. 27, 2002.

FIELD OF THE INVENTION

This invention relates to perfluoroelastomer articles having improved surface lubricity. More specifically, this invention relates to perfluoroelastomer articles coated with a thin film of a composition comprising a polysiloxane and a urethane oligomer.

BACKGROUND OF THE INVENTION

Perfluoroelastomers have achieved outstanding commercial success and are used in a wide variety of applications in which severe environments are encountered, in particular those end uses where exposure to high temperatures and aggressive chemicals occurs. For example, these polymers are often used in seals for aircraft engines, in oil-well drilling devices, and in sealing elements for industrial equipment used at high temperatures.

The outstanding properties of perfluoroelastomers are largely attributable to the stability and inertness of the copolymerized perfluorinated monomer units that make up the major portion of the polymer backbones in these compositions. Such monomers include tetrafluoroethylene and perfluorinated vinyl ethers. In order to develop elastomeric properties fully, perfluoroelastomers are typically crosslinked, i.e. vulcanized. To this end, a small amount of cure site monomer is copolymerized with the perfluorinated monomer units. Cure site monomers containing at least one nitrile group, for example perfluoro-8-cyano-5-methyl-3,6-dioxa-1-octene, are especially preferred. Such compositions are described in U.S. Pat. Nos. 4,281,092; 4,394,489; 5,789,489; and 5,789,509.

In certain end use applications, a cured perfluoroelastomer article may undesirably adhere to the surface of other materials that are in contact with it, particularly if the perfluoroelastomer article and other material are forcibly held in contact for a long period of time at elevated pressures and temperatures, and then cooled. It may be difficult, or impossible, to easily remove the perfluoroelastomer article from contact with the other material without damaging the perfluoroelastomer article, other material, or both. Also, the perfluoroelastomer article may be undesirably pulled from the groove in which it is seated when the article is being separated from a surface to which it has adhered. Thus, there is a need for perfluoroelastomer articles that have an improved, less sticky surface.

Kishino et al. (U.S. Pat. No. 5,763,068) disclose fluororesin-coated fluoroelastomer articles. In contrast to perfluoroelastomers, fluoroelastomers contain copolymerized units of at least one monomer which is either partially fluorinated (such as vinylidene fluoride), or non-fluorinated (such as propylene). The articles are made by first blending uncured fluoroelastomer with up to 50 parts fluororesin; shaping the blend into an article and curing it; coating the cured article with an aqueous fluororesin dispersion; drying the coated article; and finally heating the article above the melting point of the fluororesin in order to form a durable fluororesin film coating. However, blending a high level of fluororesin with a fluoroelastomer or perfluoroelastomer typically reduces the physical properties of cured articles produced from such blends, especially if the articles are used in a high temperature environment. Compression set resistance and elongation are particularly adversely effected. Heating fluoroelastomer articles to a temperature of about 300° C. or higher, in order to melt the fluororesin, may further degrade the physical properties of the articles.

Tarney et al. (WO 02/20650) disclose fluoropolymer coated perfluoroelastomer articles which have good physical properties and a low stick surface. However, in demanding applications which require excellent high vacuum sealing performance, Tarney's articles may leak due to the nature of the surface coating. Thus, there is a need for perfluoroelastomer articles that have an improved, less sticky surface and which have excellent sealing performance in high vacuum applications such as in some semiconductor manufacturing equipment.

SUMMARY OF THE INVENTION

An aspect of this invention is a cured perfluoroelastomer article having a surface coated with a film comprising a polysiloxane and a urethane oligomer.

Another aspect of this invention is a process comprising:

A. coating a cured perfluoroelastomer article with a dispersion comprising i) a polysiloxane having pendant hydroxyl groups and ii) a blocked isocyanate to form a wet-coated perfluoroelastomer article;

B. drying said wet-coated perfluoroelastomer article to form a dry-coated perfluoroelastomer article at a temperature below which said pendant hydroxyl groups react with said blocked isocyanate to form urethane oligomer; and C. heating said dry-coated perfluoroelastomer article to a temperature and for a sufficient period of time where said pendant hydroxyl groups react with said blocked isocyanate to form urethane oligomer and a durable film comprising said polysiloxane and urethane oligomer on the surface of said perfluoroelastomer article.

DETAILED DESCRIPTION OF THE INVENTION

Perfluoroelastomers are polymeric compositions having copolymerized units of at least two principal perfluorinated monomers. Generally, one of the principal comonomers is a perfluoroolefin while the other is a perfluorovinyl ether. Representative perfluorinated olefins include tetrafluoroethylene and hexafluoropropylene. Suitable perfluorinated vinyl ethers include those of the formula $$CF_2=CFO(R_fO)_n(R_{f'}O)_mR_f$$ (I)

where $R_f$ and $R_{f'}$ are different linear or branched perfluoroalkylene groups of 2–6 carbon atoms, m and n are independently 0–10, and $R_f$ is a perfluoroalkyl group of 1–6 carbon atoms.

A preferred class of perfluorinated vinyl ethers includes compositions of the formula $$CF_2=CFO(CF_2CFXO)_nR_f$$ (II)

where X is F or $CF_3$, n is 0–5, and $R_f$ is a perfluoroalkyl group of 1–6 carbon atoms.

Most preferred perfluorinated vinyl ethers are those wherein n is 0 or 1 and $R_f$ contains 1–3 carbon atoms. Examples of such perfluorinated ethers include perfluoro (methyl vinyl) ether and perfluoro(propyl vinyl) ether. Other useful monomers include compounds of the formula $$CF_2=CFO[(CF_2)_mCF_2CFZO]_nR_f \qquad (III)$$

where $R_f$ is a perfluoroalkyl group having 1–6 carbon atoms, m=0 or 1, n=0–5, and Z=F or $CF_3$.

Preferred members of this class are those in which $R_f$ is $C_3F_7$, m=0, and n=1. Additional perfluorinated vinyl ether monomers include compounds of the formula $$CF_2=CFO[(CF_2CFCF_3O)_n(CF_2CF_2CF_2O)_m(CF_2)_p]C_xF_{2x+1} \qquad (IV)$$

where m and n=1–10, p=0–3, and x=1–5.

Preferred members of this class include compounds where n=0–1, m=0–1, and x=1.

Additional examples of useful perfluorinated vinyl ethers include $$CF_2=CFOCF_2CF(CF_3)O(CF_2O)_mC_nF_{2n+1} \qquad (V)$$

where n=1–5, m=1–3, and where, preferably, n=1.

Preferred perfluoroelastomer copolymers are comprised of tetrafluoroethylene and at least one perfluorinated vinyl ether as principal monomer units. In such copolymers, the copolymerized perfluorinated ether units constitute from about 15–50 mole percent of total monomer units in the polymer.

The perfluoroelastomer further contains copolymerized units of at least one cure site monomer, generally in amounts of from 0.1–5 mole percent. The range is preferably between 0.3–1.5 mole percent. Although more than one type of cure site monomer may be present, most commonly one cure site monomer is used and it contains at least one nitrile substituent group. Suitable cure site monomers include nitrile-containing fluorinated olefins and nitrile-containing fluorinated vinyl ethers. Useful nitrile-containing cure site monomers include those of the formulas shown below.

$$CF_2=CF-O(CF_2)_n-CN \qquad (VI)$$

where n=2–12, preferably 2–6;

$$CF_2=CF-O[CF_2-CFCF_3-O]_n-CF_2-CFCF_3-CN \qquad (VII)$$

where n=0–4, preferably 0–2; and $$CF_2=CF-[OCF_2CFCF_3]_x-O-(CF_2)_n-CN \qquad (VIII)$$

where x=1–2, and n=1–4.

Those of formula (VIII) are preferred. Especially preferred cure site monomers are perfluorinated polyethers having a nitrile group and a trifluorovinyl ether group. A most preferred cure site monomer is $$CF_2=CFOCF_2CF(CF_3)OCF_2CF_2CN \qquad (IX)$$

i.e. perfluoro(8-cyano-5-methyl-3,6-dioxa-1-octene) or 8-CNVE.

Other cure site monomers include olefins represented by the formula $R_1CH=CR_2R_3$, wherein $R_1$ and $R_2$ are independently selected from hydrogen and fluorine and $R_3$ is independently selected from hydrogen, fluorine, alkyl, and perfluoroalkyl. The perfluoroalkyl group may contain up to about 12 carbon atoms. However, perfluoroalkyl groups of up to 4 carbon atoms are preferred. In addition, the cure site monomer preferably has no more than three hydrogen atoms. Examples of such olefins include ethylene, vinylidene fluoride, vinyl fluoride, trifluoroethylene, 1-hydropentafluoropropene, and 2-hydropentafluoropropene, as well as brominated olefins such as 4-bromo-3,3,4,4-tetrafluorobutene-1 and bromotrifluoroethylene. Alternatively, or in addition to copolymerized units of cure site monomers, cure sites of bromine or iodine-containing end groups may be introduced onto the perfluoroelastomer polymer chain by the reaction of bromine or iodine-containing chain transfer agents during polymerization.

Another type of cure site monomer which may be incorporated in the perfluoroelastomers employed in this invention is perfluoro(2-phenoxypropyl vinyl ether) and related monomers as disclosed in U.S. Pat. No. 3,467,638.

An especially preferred perfluoroelastomer contains 53.0–79.9 mole percent tetrafluoroethylene, 20.0–46.9 mole percent perfluoro(methyl vinyl) ether and 0.4 to 1.5 mole percent nitrile-containing cure site monomer.

When the perfluoroelastomer has copolymerized units of a nitrile-containing cure site monomer, a cure system based on an organotin compound can be utilized. Suitable organotin compounds include allyl-, propargyl-, triphenyl- and allenyl tin curatives. Tetraalkyltin compounds or tetraaryltin compounds are the preferred curing agents for use in conjunction with nitrile-substituted cure sites. The amount of curing agent employed will necessarily depend on the degree of crosslinking desired in the final product as well as the type and concentration of reactive moieties in the perfluoroelastomer. In general, about 0.5–10 parts by weight per 100 parts elastomer (phr) of curing agent can be used, and 14 phr is satisfactory for most purposes. It is believed that the nitrile groups trimerize to form s-triazine rings in the presence of curing agents such as organotin, thereby crosslinking the perfluoroelastomer. The crosslinks are thermally stable, even at temperatures of 275° C. and above.

A preferred cure system, useful for perfluoroelastomers containing nitrile-containing cure sites, utilizes bis (aminophenols) and bis(aminothiophenols) of the formulas

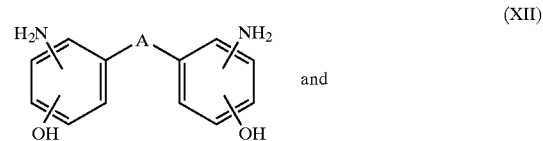

(XII)

and

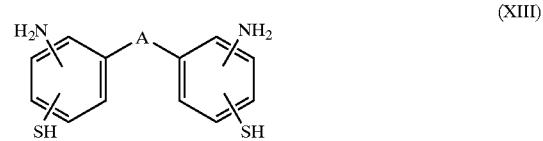

(XIII)

and tetraamines of the formula

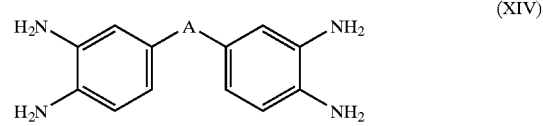

(XIV)

where A is $SO_2$, O, CO, alkyl of 1–6 carbon atoms, perfluoroalkyl of 1–10 carbon atoms, or a carbon-carbon bond linking the two aromatic rings. The amino and hydroxyl or thio groups in formulas XII and XIII above are adjacent to each other on the benzene rings and are interchangeably in the meta and para positions with respect to the group A. Preferably, the curing agent is a compound selected from the group consisting of 4,4'-[2,2,2-trilfuoro-1-(trifluoromethyl) ethylidene]bis(2-aminophenol); 4,4'-sulfonylbis(2-aminophenol); 3,3'-diaminobenxidine; and 3,3',4,4'- tetraaminobenzophenone. The first of these is the most preferred and will be referred to as bis(aminophenol) AF. The curing agents can be prepared as disclosed in U.S. Pat. No. 3,332,907 to Angelo. Bis(aminophenol) AF can be prepared by nitration of 4,4'-[2,2,2-trifluoro-1-(trifluoromethyl)ethylidene]bisphenol (i.e. bisphenol AF), preferably with potassium nitrate and trifluoroacetic acid, followed by catalytic hydrogenation, preferably with ethanol as a solvent and a catalytic amount of palladium on carbon as catalyst. The level of curing agent should be chosen to optimize the desired properties of the vulcanizate. In general, a slight excess of curing agent over the amount required to react with all the cure sites present in the perfluoroelastomer is used. Typically, 0.5–5.0 parts by weight of the curative per 100 parts of elastomer is required. The preferred range is 1.0–2.0 phr.

Peroxides may also be utilized as curing agents, particularly when the cures site is a nitrile group or an iodine or bromine group. Useful peroxides are those which generate free radicals at curing temperatures. A dialkyl peroxide or a bis(dialkyl peroxide) which decomposes at a temperature above 50° C. is especially preferred. In many cases it is preferred to use a ditertiarybutyl peroxide having a tertiary carbon atom attached to peroxy oxygen. Among the most useful peroxides of this type are 2,5-dimethyl-2,5-di(tertiaryburylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, and di[1,3-dimethyl-3-(t-butylperoxy)butyl]carbonate. Generally, about 1–3 parts of peroxide per 100 parts of perfluoroelastomer is used. Another material which is usually blended with the composition as a part of the peroxide curative system is a coagent composed of a polyunsaturated compound which is capable of cooperating with the peroxide to provide a useful cure. These coagents can be added in an amount between 0.1 and 10 parts per 100 parts perfluoroelastomer, preferably between 2–5 phr. The coagent may be one or more of the following compounds: triallyl cyanurate; triallyl isocyanurate; tri(methylallyl) isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate.

Other curatives suitable for vulcanizing perfluoroelastomers having nitrile cure sites include ammonia, the ammonium salts of inorganic or organic acids (e.g. ammonium perfluorooctanoate) as disclosed in U.S. Pat. No. 5,565,512, and compounds (e.g. urea) which decompose to produce ammonia as disclosed in U.S. Pat. No. 6,281,296 B1.

Depending on the cure site monomers present, it is also possible to use a dual cure system. For example, perfluoroelastomers having copolymerized units of nitrile-containing cure site monomers can be cured using a curative comprising a mixture of a peroxide in combination with an organotin curative and a coagent. Generally, 0.3–5 parts of peroxide, 0.3–5 parts of coagent, and 0.1–10 parts of organotin curative are utilized.

Additives, such as fillers (e.g. non-fibrillating and fibrillating fluoropolymers, carbon black, barium sulfate, silica, aluminum oxide, aluminum silicate, and titanium dioxide), stabilizers, plasticizers, lubricants, and processing aids typically utilized in perfluoroelastomer compounding can be incorporated into the compositions of the present invention, provided they have adequate stability for the intended service conditions.

Cured perfluoroelastomer articles employed in this invention are made by shaping and then curing the above perfluoroelastomer compositions. Curing may be induced by heat or by radiation. The article may subsequently be post cured at elevated temperatures for a period of time.

After extensive research, a polymeric coating composition has been found which provides perfluoroelastomer articles having both low surface stickiness and good sealing properties. The durable films which coat the perfluoroelastomer articles employed in this invention are comprised of at least one polysiloxane and at least one urethane oligomer. Pendant functional groups on the polysiloxane (e.g. hydroxyl groups) react during film curing with a compound in the coating mixture having pendant isocyanate groups to form covalent bonds (i.e. a urethane oligomer).

Mixtures of polysiloxanes that contain functional groups capable of reacting with isocyanate groups and non-reactive polysiloxanes may be employed in the coating compositions of this invention.

Examples of isocyanates that may be employed in this invention include, but are not limited to diphenylmethane diisocyanate, hexamethylene diisocyanate, tolylene diisocyanate, xylylene diisocyanate, and 4,4'-methylene bis (cyclohexyl isocyanate).

Prior to curing the coating composition onto the perfluoroelastomer part, the isocyanate is in the form of a derivative (i.e. a blocked isocyanate) which is unreactive with the pendant functional groups on the polysiloxane. Such derivatives are formed by reacting one or more compounds such as phenols, oximes, mercaptans, acid amides, acid imides, imidazoles, ureas, amines, or imides with the isocyanate. At elevated temperature (e.g. the film curing temperature), the derivatives dissociate, leaving the isocyanate groups to react with pendant functional groups on the polysiloxane, forming the urethane oligomer.

A preferred uncured coating composition for use in this invention comprises i) a mixture of the polysiloxanes

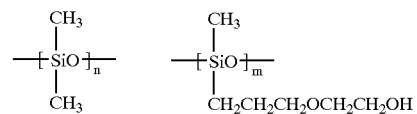

wherein the values of n and m are such that the number average molecular weights of the two polysiloxanes are between 500 and 5000 (as measured by size exclusion chromatography employing polystyrene calibration standards), and ii) the isocyanate

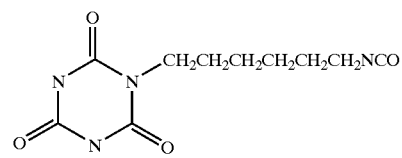

blocked with 2-butanone oxime.

Preferably the ratio of polysiloxanes to isocyanate is approximately 7:3 (by weight). Such a mixture is commercially available as SAT No. 7 from Shinko Technical Research Company, Ltd., Tokyo, Japan.

In the process of this invention, the uncured polysiloxane—blocked isocyanate coating composition is applied as a dispersion to a cured perfluoroelastomer article. Liquids other than water (e.g. ethyl acetate) may be used to form the dispersion. The dispersion typically comprises between 5 and 10 weight percent polysiloxane, based on the total weight of the dispersion. The weight ratio of polysiloxane to blocked isocyanate is between 9:1 and 1:1. The dispersion may also contain minor amounts of other ingredients such as surfactants, pH buffers, etc.

The cured, perfluoroelastomer article may be coated with polysiloxane-blocked isocyanate dispersion by any means commonly employed in the art such as by dipping, spray coating, or by contacting with an applicator. Coating thickness is typically 0.1 to 10 microns, preferably 3 to 7 microns. Generally, the thicker the coating, the less sticky the resulting perfluoroelastomer article. However, as the coating thickness increases, the article's ability to form a good (i.e. non-leaking) seal decreases, so the two properties must be balanced for a particular end use application.

The wet-coated article thus produced is then dried to remove most of the liquid. Drying may be done at any temperature less than the temperature where the blocked isocyanate reacts with the pendant hydroxyl groups on the polysiloxane to form urethane oligomer during the drying time. Care must be taken not to dry the coating too quickly. Otherwise, bubbles may form in the coating, which when burst, may result in large non-coated areas on the surface of the article. Typically, drying is done in air at room temperature (20° C.).

The dry-coated article thus produced is then heated to a temperature where the reaction of the blocked isocyanate and pendant hydroxy groups on the polysiloxane occurs during a reasonable period of time, thus forming a cured, durable film of polysiloxane-urethane oligomer on the surface of the perfluoroelastomer article. This will be at a temperature greater than 100° C. for more than 5 minutes. Often, curing at 200° C. for 10 minutes yields an optimum polysiloxane-urethane oligomer film. One skilled in the art will recognize that this period of time will vary depending upon the actual blocked isocyanate and polysiloxane contained in the coating composition. It is not necessary that the resulting film be a continuous film of uniform thickness in order for the resulting perfluoroelastomer article to have a greatly improved surface with little or no stickiness. The physical properties of the film-coated articles of this invention have comparable physical properties to non-coated perfluoroelastomer articles.

To improve the durability (i.e. adhesion) of the film onto the surface of a cured perfluoroelastomer article, the surface of the article may preferably be pre-treated, i.e. prior to application of the dispersion, to increase surface area. Examples of suitable surface treatments for use in this invention include, but are not limited to roll flow, sanding, grinding, and plasma or chemical etching. Roll flow refers to a process wherein a cured perfluoroelastomer article and abrasive particles are agitated in a container for a period of time in order to increase the surface area of the article via introduction of microscopic pits, cracks and the like-onto the surface. Sanding and plasma or chemical etching increases the article's surface area by similar means. Preferably, the surface is also cleaned with an appropriate solvent to remove contaminants such as mold release agents, lubricants, oils, etc.

The polysiloxane-urethane oligomer film coated perfluoroelastomer articles of this invention are useful in many end use applications such as those involving high temperatures (i.e. 200° C. or more) and harsh chemical or plasma environments wherein it is undesirable for the perfluoroelastomer articles to stick to the surfaces of materials with which the articles are in contact. Examples of such end use applications include semiconductor manufacturing equipment and the chemical process industry.

EXAMPLES

Test Method

Sticking Force

Stickiness was measured on type AS-214 o-rings. An o-ring was compressed 25% in a jig between two stainless steel plates. The jig was then placed in an air oven for 16 hours at 160° C. Afterwards, the jig was removed from the oven and allowed to cool at room temperature for 3 hours. The plates were then attached to an Instron and the force required to pull the plates apart was measured. A sticking force less than 100 N was acceptable, between 100 and 150 N marginal and greater than 150 N unacceptable.

Helium Leak Test

A film-coated type AS-214 o-ring was used in a jig to form a seal between a chamber fillable with helium and a chamber under vacuum. The o-ring was compressed 25%. The vacuum chamber was connected to a ULVAC HELIOT 301 Helium Leak Detector. The test was run by measuring the elapsed time between when helium was introduced into the helium chamber and when it was detected at the rate of at least $10^{-10}$ Pa m$^3$/sec by the He detector. An elapsed time of greater than 30 seconds was acceptable, between 30 seconds and 15 seconds marginal, and less than 15 seconds, unacceptable.

Example 1

The cured perfluoroelastomer articles employed in this Example were type AS-214 o-rings made from a perfluoroelastomer comprising copolymerized units of tetrafluoroethylene, perfluoro(methyl vinyl)ether and perfluoro(8-cyano-5-methyl-3,6-dioxa-1-octene). In addition to perfluoroelastomer, o-rings contained 6.5 phr $TiO_2$ and 3 phr $SiO_2$.

O-rings were spray coated with an ethyl acetate dispersion containing 10 weight percent SAT No. 7 polysiloxane-blocked isocyanate coating composition (available from Shinko Technical Research Company, Ltd.). The coated o-rings were dried in air and then baked in an air oven at 200° C. for 10 minutes to yield polysiloxane-urethane oligomer film-coated perfluoroelastomer articles of this invention. The coated o-rings were washed with water. Film thickness was 5 microns.

Sticking force of the film-coated perfluoroelastomer o-rings was measured according to the Test Method. The results for the film coated o-rings of the invention averaged 40 N for 3 o-rings tested. The sticking force of a comparative (i.e. not coated) perfluoroelastomer o-ring was measured as 300 N.

The sealing ability of three other film-coated o-rings prepared above was measured by the He leak test method. The average elapsed time was greater than 60 seconds.

Example 2

The cured perfluoroelastomer articles employed in this Example were type AS-214 o-rings made from a perfluoroelastomer comprising copolymerized units of tetrafluoroethylene, perfluoro(methyl vinyl)ether and perfluoro(8-cyano-5-methyl-3,6-dioxa-1-octene). In addition to perfluoroelastomer, o-rings contained 6.5 phr $TiO_2$ and 3 phr $SiO_2$.

A set of 3 o-rings was spray coated with an ethyl acetate dispersion containing 10 weight percent SAT No. 7; another set of 3 o-rings was spray coated with a 10 wt. % solution of SAT No. 7A; 3 other o-rings with SAT No. 7B; and 3 other o-rings with SAT No. 7C. polysiloxane-blocked isocyanate coating composition (available from Shinko Technical Research Company, Ltd.). The various coating solutions (7, 7A, 7B and 7C) differed in the weight ratio of polysiloxane to isocyanate. The coated o-rings were dried in air and then baked in an air oven at 250° C. for 15 minutes to yield polysiloxane-urethane oligomer film-coated perfluoroelastomer articles of this invention. Film thickness was 3 microns.

Sticking force of film-coated perfluoroelastomer o-rings was measured according to the Test Method. The results for the film coated o-rings of the invention averaged less than 40 N for each set of 3 o-rings coated with SAT No. 7, 7A, 7B and 7C. The sticking force of a comparative (i.e. not coated) perfluoroelastomer o-ring was measured as 300 N.

Four fresh sets of 3 o-rings each were prepared as above, coated with SAT No. 7, 7A, 7B and 7C. respectively. The average sealing ability of each of these sets was measured by the He leak test method. The average elapsed time for each set was greater than 60 seconds.

What is claimed is:

1. A perfluoroelastomer article coated with a durable film comprising A) a mixture of polysiloxanes of formulas

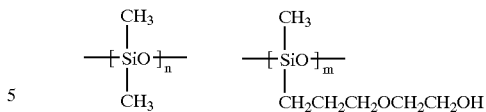

wherein n and m are such that said polysiloxanes each have a number average molecular weight between 500 and 5000, as measured by size exclusion chromatography employing polystyrene calibration standards; and B) a urethane oligomer.

2. A perfluoroelastomer article of claim 1 wherein said film is of a thickness between 0.1 and 10 microns.

3. A perfluoroelastomer article of claim 2 wherein said film is of a thickness between 3 and 7 microns.

4. A perfluoroelastomer article of claim 1 wherein said urethane oligomer is based on an isocyanate of the formula

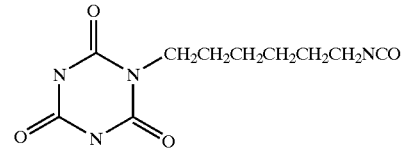

* * * * *